United States Patent
Kurth et al.

(10) Patent No.: US 10,150,827 B2
(45) Date of Patent: Dec. 11, 2018

(54) IMIDAZOLINE FUNCTIONALIZED OXIDIZED FATTY SUBSTANCE EMULSIFIERS AND METHODS

(71) Applicant: CARGILL, INCORPORATED, Wayzata, MN (US)

(72) Inventors: Todd L. Kurth, Maple Grove, MN (US); Suzanne Stauduhar, Robbinsdale, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 45 days.

(21) Appl. No.: 15/520,707

(22) PCT Filed: Oct. 23, 2015

(86) PCT No.: PCT/US2015/057129
§ 371 (c)(1),
(2) Date: Apr. 20, 2017

(87) PCT Pub. No.: WO2016/065270
PCT Pub. Date: Apr. 28, 2016

(65) Prior Publication Data
US 2017/0306067 A1 Oct. 26, 2017

Related U.S. Application Data

(60) Provisional application No. 62/067,776, filed on Oct. 23, 2014.

(51) Int. Cl.
C08F 210/02 (2006.01)
C08K 5/109 (2006.01)
(Continued)

(52) U.S. Cl.
CPC .......... C08F 210/02 (2013.01); C08G 69/34 (2013.01); C08G 73/0616 (2013.01);
(Continued)

(58) Field of Classification Search
CPC ......... C08K 5/109; C08K 5/16; C08L 95/005; C08L 2555/28; C08G 73/0616; C08G 69/34; C23F 11/145; C08F 210/02
(Continued)

(56) References Cited

U.S. PATENT DOCUMENTS 4,927,669 A   5/1990   Knox et al.
5,008,382 A   4/1991   Schilling et al.
(Continued)

*Primary Examiner* — William K Cheung

(57) ABSTRACT

Imidazoline functionalized oxidized fatty substance emulsifiers are made by obtaining a fatty substance composition; performing an oxidative oligomerization of the fatty substance composition to produce an oxidized fatty substance composition comprising from about 10 to about 75% by weight of oligomeric fatty acid components based on the total weight of fatty acid containing components in the composition; reacting the oxidized fatty substance composition with a polyamine comprising at least one ethylene diamine functional group with at least three hydrogens attached to the two nitrogens to form an aminoethylamido functionalized oxidized fatty substance composition; and forming an imidazoline functionalized oxidized fatty substance emulsifier from the aminoethylamido functionalized oxidized fatty substance composition. Such compositions are particularly useful in asphalt applications and corrosion inhibition.

20 Claims, 2 Drawing Sheets

(51) Int. Cl.
*C08K 5/16* (2006.01)
*C08G 69/34* (2006.01)
*C08L 95/00* (2006.01)
*C23F 11/14* (2006.01)
*C08G 73/06* (2006.01)

(52) U.S. Cl.
CPC ............. *C08K 5/109* (2013.01); *C08K 5/16* (2013.01); *C08L 95/005* (2013.01); *C23F 11/145* (2013.01); *C08L 2555/28* (2013.01)

(58) Field of Classification Search
USPC .......................................................... 516/43
See application file for complete search history.

(56) References Cited

U.S. PATENT DOCUMENTS

| | | |
|---|---|---|
| 2008/0069638 A1 | 3/2008 | Crews et al. |
| 2008/0179570 A1 | 7/2008 | Hurd et al. |
| 2009/0065736 A1 | 3/2009 | Johnson et al. |
| 2009/0194731 A1 | 8/2009 | Hurd et al. |
| 2011/0009533 A1* | 1/2011 | Gonzalez Leon ... C08G 83/008 524/68 |
| 2011/0034593 A1 | 2/2011 | Gonzalez et al. |

* cited by examiner

US 10,150,827 B2

IMIDAZOLINE FUNCTIONALIZED OXIDIZED FATTY SUBSTANCE EMULSIFIERS AND METHODS

CROSS REFERENCE TO RELATED APPLICATIONS

This application is a section 371 national-stage phase of International Application No. PCT/US15/57129, filed 23 Oct. 2015 entitled IMIDAZOLINE FUNCTIONALIZED OXIDIZED FATTY SUBSTANCE EMULSIFIERS AND METHODS, which claims priority to U.S. Application Ser. No. 62/067,776, filed 23 Oct. 2014 entitled IMIDAZOLINE FUNCTIONALIZED OXIDIZED FATTY SUBSTANCE EMULSIFIERS AND METHODS, which are hereby incorporated by reference in their entirety.

FIELD OF THE INVENTION

The present invention relates to emulsifiers. More specifically, the present invention relates to imidazoline functionalized emulsifiers.

BACKGROUND OF THE INVENTION

Worker safety and environmental concerns are increasingly impactful on the selection of application methods for the production of roadways. For many years, bitumen emulsions have provided routes to application methods free of volatile solvents and with greatly reduced application temperatures. For this reason, there is an increasing need for emulsifiers and emulsifiers systems that provide control of emulsion stability under different site specific conditions.

Emulsifiers are used in bituminous asphalt compositions to provide desired rheological properties during application of the compositions to a surface, i.e. to provide workability for a time period at a given composition temperature, followed by breaking of the emulsion for setting of the composition on the substrate. Asphalt formulations are in need of modification to meet performance expectations.

SUMMARY OF THE INVENTION

New imidazoline functionalized oxidized fatty substance emulsifiers are provided in a unique process. In this process, an oxidative oligomerization is carried out on a fatty substance composition to produce an oxidized fatty substance composition comprising from about 10 to about 75% by weight of oligomeric fatty acid components (i.e. compounds having a fatty acid component that are dimers or having three or more mer units) based on the total weight of fatty acid containing components in the composition.

This oxidized fatty substance composition is reacted with a polyamine comprising at least one ethylene diamine functional group with at least three hydrogens attached to the two nitrogens to form an aminoethylamido functionalized oxidized fatty substance composition. Imidazoline functionalized oxidized fatty substance emulsifier is formed from the aminoethylamido functionalized oxidized fatty substance composition.

In an embodiment, the oxidative oligomerization is carried out by heating a fatty substance composition and passing an oxygen-containing stream through the heated fatty substance composition to produce an oxidized fatty substance composition.

Imidazoline functionalized oxidized fatty substance emulsifiers may in one embodiment provide excellent emulsification properties, particularly in the context of the use of asphalt for road pavement or treatment thereof. While not being bound by theory, it is believed that the unique nature of the imidazoline functionalized oxidized fatty substance components provides an imidazoline emulsifier that provides excellent emulsification properties with the ability to tune the performance of the emulsifier to provide reliable and predictable asphalt mix times. The emulsifiers made via oxidized fatty substances are superior to those prepared using other oligomer reaction processes, such as fatty substance compositions that are reacted using non-oxidative conditions, such as thermal polymerization or via super-acid catalyzed or acid clay catalyzed reaction processes.

The present imidazoline functionalized oxidized fatty substance emulsifiers additionally may exhibit excellent performance in applications where fatty acid imidazolines are used, e.g. such as in corrosion inhibitor compositions, epoxy or other polymer curatives, cationic surfactants for hydrophobization or other surface modification applications.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION OF PRESENTLY PREFERRED EMBODIMENTS

Figure 1:
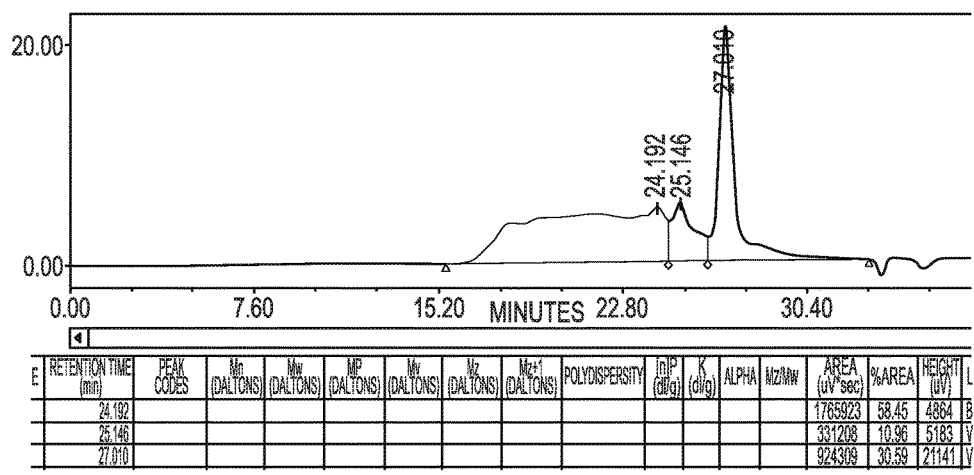
FIG. 1 is a GPC spectra showing elution of an oxidized fatty substance composition.

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

The method comprises obtaining a fatty substance composition. For purposes of the present description, a fatty substance composition is defined as a composition comprising compounds having a fatty acid component, wherein the compound is in the form of the acid, salt, or esters thereof.

In an embodiment, at least about 60% by weight of the compounds having a fatty acid component in the fatty substance composition are compounds selected from the group consisting of fatty acids or their salts, and combinations thereof. In an embodiment, at least about 70% or at least about 80% or at least about 90% by weight of the compounds having a fatty acid component in the fatty substance composition are compounds selected from the group consisting of fatty acids or their salts, and combinations thereof.

In an embodiment, at least about 60% by weight of the compounds having a fatty acid component in the fatty substance composition are compounds selected from the group consisting of the fatty acid esters of alkyl mono- or poly-alcohols and combinations thereof. In an embodiment, at least about 70% or at least about 80% or at least about 90% by weight of the compounds having a fatty acid component in the fatty substance composition are compounds selected from the group consisting of the fatty acid esters of alkyl mono- or alcohols and combinations thereof.

In an embodiment, at least about 60% by weight of the compounds having a fatty acid component in the fatty substance composition are compounds selected from the group consisting of the fatty acid esters of $C_1$-$C_8$ alkyl mono-alcohols and combinations thereof. In an embodiment, at least about 70% or at least about 80% or at least about 90% by weight of the compounds having a fatty acid component in the fatty substance composition are compounds selected from the group consisting of the fatty acid esters of $C_1$-$C_8$ alkyl mono-alcohols and combinations thereof.

In an embodiment, at least about 60% by weight of the compounds having a fatty acid component in the fatty substance composition are compounds selected from the group consisting of the mono-, di-, or tri-fatty acid esters of glycerol and combinations thereof. In an embodiment, at least about 70% or at least about 80% or at least about 90% by weight of the compounds having a fatty acid component in the fatty substance composition are compounds selected from the group consisting of the mono-, di-, or tri-fatty acid esters of glycerol and combinations thereof.

In an embodiment, the fatty substance composition comprises from about 10% to about 15% by weight free fatty acids, from about 12% to about 20% by weight diacylglycerides, and from about 65% to about 78% by weight trialycerides, based on the total of the compounds having a fatty acid component in the fatty substance composition.

In an embodiment, at least about 60% by weight of the compounds having a fatty acid component in the fatty substance composition are compounds selected from the group consisting of fatty acid components having an average molecular weight ranging from about 200 to about 1000 (g/mol), In an embodiment, at least about 70% or at least about 80% or at least about 90% by weight of the compounds having a fatty acid component in the fatty substance composition are compounds selected from the group consisting of fatty acid components having an average molecular weight ranging from about 200 to about 1000 (g/mol).

In an embodiment, at least about 60% by weight of the compounds having a fatty acid component in the fatty substance composition are compounds selected from the group consisting of fatty acid components having an average molecular weight ranging from about 600 to about 2000 (g/mol). In an embodiment, at least about 70% or at least about 80% or at least about 90% by weight of the compounds having a fatty acid component in the fatty substance composition are compounds selected from the group consisting of fatty acid components having an average molecular weight ranging from about 600 to about 2000 (g/mol).

In an embodiment, at least about 60% by weight of the compounds having a fatty acid component in the fatty substance composition are compounds selected from the group consisting of fatty acid components having an average molecular weight ranging from about 900 to about 3000 (g/mol). In an embodiment, at least about 70% or at least about 80% or at least about 90% by weight of the compounds having a fatty acid component in the fatty substance composition are compounds selected from the group consisting of fatty acid components having an average molecular weight ranging from about 900 to about 3000 (g/mol).

In an embodiment, at least about 60% by weight of the compounds having a fatty acid component in the fatty substance composition are compounds wherein the acid portion has an average carbon length of $C_4$-$C_{28}$ or, in embodiments, an average carbon length of $C_8$-$C_{25}$. In an embodiment, at least about 70% or at least about 80% or at least about 90% by weight of the compounds having a fatty acid component in the fatty substance composition are compounds wherein the acid portion has an average carbon length of $C_4$-$C_{28}$ or, in embodiments, an average carbon length of $C_8$-$C_{25}$. In the above embodiments, the acid portion may comprise saturated, mono-unsaturated or poly-unsaturated, linear or branched, cyclic or acyclic carbon chains.

In an embodiment, at least about 40% by weight of the compounds having a fatty acid component in the fatty substance composition are compounds wherein the acid portion comprises at least one double bond. In an embodiment, from about 10% to about 75% by weight of the compounds having a fatty acid component in the fatty substance composition are compounds wherein the acid portion comprises one double bond. In an embodiment, from about 20% to about 50% by weight of the compounds having a fatty acid component in the fatty substance composition are compounds wherein the acid portion comprises one double bond.

In an embodiment, at least about 5% by weight of the compounds having a fatty acid component in the fatty substance composition are compounds wherein the acid portion comprises at least two double bonds. In an embodiment, from about 5% to about 75% by weight of the compounds having a fatty acid component in the fatty substance composition are compounds wherein the acid portion comprises at least two double bonds. In an embodiment, from about 25% to about 70% by weight of the compounds having a fatty acid component in the fatty substance composition are compounds wherein the acid portion comprises at least two double bonds.

In an embodiment, from about 15% to about 70% by weight of the compounds having a fatty acid component in the fatty substance composition are compounds wherein the acid portion comprises one double bond, and from about 25% to about 75% by weight of the compounds having a fatty acid component in the fatty substance composition are compounds wherein the acid portion comprises at least two double bonds. In an embodiment, from about 15% to about 35% by weight of the compounds having a fatty acid component in the fatty substance composition are compounds wherein the acid portion comprises one double bond, and from about 40% to about 75% by weight of the compounds having a fatty acid component in the fatty substance composition are compounds wherein the acid portion comprises at least two double bonds.

In an embodiment, the fatty substance composition comprises components recovered from a member of the group consisting of oils or derivatives thereof, fats or derivatives thereof; and mixtures thereof. In an embodiment, the fatty substance composition comprises oils or fats found in nature, such as animal and/or vegetable oils and fats (such as tallow or lanolin). In an embodiment, the fatty substance composition comprises synthetically produced oils or fats, such as those derived from petroleum.

In an embodiment, the fatty substance composition comprises components recovered from a member of the group selected from castor oil, corn oil, corn stillage oil, cottonseed oil, canola oil, grape seed oil, hazelnut oil, jojoba oil, linseed oil, olive oil, palm oil, peanut oil, poppy seed oil, pumpkin seed oil, safflower oil, sesame oil, soybean oil, sunflower oil, tall oil, tang oil, walnut oil, their derivatives, as well as their mixtures. Particularly preferred oils for use as the fatty substance composition include linseed oil, soybean oil, sunflower oil, corn oil, canola oil and peanut oil. In an embodiment, any of the above mentioned oils or mixtures thereof may be modified by addition of mono- or poly-unsaturated fatty acid components to provide a desired unsaturation profile for the overall fatty substance composition.

In an embodiment, the fatty substance composition is free of rosin. In another embodiment, fatty substance composition is free of tall oil components.

In an embodiment, the fatty substance composition has an iodine value prior to being oxidized from about 50 to about 200, or from about 80 to about 180, or from about 90 to about 160. "Iodine Value" (IV) is defined as the number of grams of iodine that will react with 100 grams of material being measured. Iodine value is a measure of the unsaturation (carbon-carbon double bonds and carbon-carbon triple bonds) present in a material. Iodine Value is reported in units of arams iodine (I2) per 100 grams material and is determined using the procedure of AOCS Cd Id-92.

In an embodiment, the fatty substance composition has a hydroxyl value prior to being oxidized of from about 0 to about 200 mg KOH/g. In an embodiment, the fatty substance composition has a hydroxyl value prior to being oxidized of from about 0 to about 50 mg KOH/a fatty acid components. "Hydroxyl Value" is a measure of the hydroxyl (—OH) groups present in a material. It is determined using the procedure of AOCS Cd 13-60.

Additives, initiators, catalysts/driers, or combinations thereof, may optionally be added to the fatty substance composition. Additives such as gums, acid oils, lecithin and/or additional fatty acids may be added to the fatty substance composition before or during the oxidation process. The use of additives may aid the manufacturing process associated with the fatty substance composition, e.g. via reduced cycle time. Initiators such as peroxide may be added to the fatty substance composition before or during the oxidation process. A base metal catalyst also may be added to the fatty substance composition before or during the oxidation process. If a base metal catalyst is used, it comprises a transitional metal, and the transitional metal is selected from the group consisting of cobalt, iron, zirconium, and combinations thereof. The base metal catalyst may be added, for example, in amounts ranging from 200-1000 ppm. A co-catalyst such as CaO or CaOH, or other non-transition metal salts, may be used to enhance the efficacy of the transition metals catalyst.

In another aspect, accelerators may also be added to the fatty substance composition. For example, oxidizing chemicals, such as persulfates and permanganates, may be added to the fatty substance composition. In the presence of oxygen (from the oxygen-containing stream, described below), these oxidizers (defined as oxidizers because they donate electrons) accelerate oxidative oligomerization.

As noted above, the fatty substance composition components are oxidatively oligomerized to produce art oxidized fatty substance composition comprising oligomeric fatty acid components, i.e. dimers and compounds having three or more mer units. In an embodiment, the oxidized fatty substance composition comprises from about 20 to about 75% by weight of oligomeric fatty acid components based on the total weight of the fatty acid containing components in the composition. The oligomerization of components of the fatty substance composition can be measured by a number of techniques known to the skilled artisan, such as by Gel Permeation Chromatography ("GPC"). One can calculate the percent oligomeric fatty acid components based on the total weight of the fatty acid containing components in the composition by measuring the relative amount of monomer in the final composition as compared to dimers and compounds having three or more mer units. For example, a sample is considered to comprise 30% of oligomeric fatty acid components based on the total weight of the fatty acid containing components in the composition if the oxidized fatty substance composition has 70% wt monomer that contains a fatty acid component, 15% wt dimer that contains a fatty acid component, and 15% wt trimer that contains a fatty acid component.

In embodiments, the oxidized fatty substance composition comprises from about 40 to about 75% by weight of oligomeric fatty acid components based on the total weight of the fatty acid containing components in the composition. In embodiments, the oxidized fatty substance composition comprises from about 50 to about 75%, or from about 60 to about 75% by weight of oligomeric fatty acid components based on the total weight of the fatty acid containing components in the composition.

In an embodiment, the oxidized fatty substance composition comprises a trimodal molecular weight distribution of fatty acid containing compounds in the oxidized fatty substance composition, i.e. the composition comprises three different molecular weight content fractions (low, medium and high relative to each other) of fatty acid containing compounds that can be identified by distinguishable peaks on a molecular weight distribution curve. In an embodiment, about 30 to about 70% by weight of fatty acid containing compounds in the oxidized fatty substance composition are in the low molecular weight range of the trimodal molecular weight distribution, about 10 to about 30% by weight of fatty acid containing compounds in the oxidized fatty substance composition are in the medium molecular weight range of the trimodal molecular weight distribution, and about 10 to about 65% by weight of fatty acid containing compounds in the oxidized fatty substance composition are in the high molecular weight range of the trimodal molecular weight distribution.

In an embodiment, the oxidized fatty substance composition comprises from about 25 to about 70% by weight of fatty acid containing compounds that are monomers; from about 5 to about 20% by weight of fatty acid containing compounds that are dimers, and from about 5 to about 65% by weight of fatty acid containing compounds having three or more mers. In an embodiment, the monomers of the oxidized fatty substance composition have an average molecular weight ranging from about 200 to about 1000 (g/mol), the dimers of the oxidized fatty substance composition have an average molecular weight ranging from about 500 to about 2000 (g/mol), and the compounds having three or more mers of the oxidized fatty substance composition have an average molecular weight ranging from about 750 to about 4000 (g/mol).

In an embodiment, the monomers of the oxidized fatty substance composition have an average molecular weight ranging from about 600 to about 2000 (g/mol), the dimers of the oxidized fatty substance composition) have an average molecular weight ranging from about 1200 to about 4000 (g/mol), and the compounds having three or more mers of the oxidized fatty substance composition have an average molecular weight ranging from about 1800 to about 6000 (g/mol).

In an embodiment, the monomers of the oxidized fatty substance composition have an average molecular weight ranging from about 850 to about 3000 (g/mol), the dimers of the oxidized fatty substance composition have an average molecular weight ranging from about 1700 to about 6000 (g/mol), and the compounds having three or more mers of the oxidized fatty substance composition have an average molecular weight ranging from about 2100 to about 9000 (g/mol).

In an embodiment, the oxidized fatty substance composition has a kinetic viscosity of from about 10 cSt at 100° C. to about 750 cSt at 100°. Viscosity is measured at the indicated temperature in accordance with ASTM D445 using the Cannon Ubbelohde tubes identified in Table 1 of this ASTM.

Additionally, in an embodiment the oxidative oligomerization process introduces hydroxyl functionality into the fatty substance composition, which also tends to increase the viscosity of the fatty substance composition.

In an embodiment, the oxidized fatty substance composition has a hydroxyl value of from about 10 to about 200 mg KOH/g. In an embodiment, the oxidized fatty substance composition has a hydroxyl value of from about 10 to about 75 mg KOH/g, or from about 15 to about 70 mg KOH/g, or from about 20 to about 60 mg KOH/g.

In an embodiment, the oxidized fatty substance composition has an iodine value of from about 10 to about 160.

This oxidative oligomerization can be carried out by any appropriate method, such as reacting the fatty substance composition with an air stream comprising oxygen or pure oxygen or hydrogen peroxide under oxidative oligomerization temperature, pressure and reaction time conditions, optionally in the presence of catalysts. Alternatively, this oxidative oligomerization can be carried out by any appropriate method, such as reacting the fatty substance composition with oxidizing agents such as hydrogen peroxide, peroxides, peroxy acids, sulfur, persulfates, permanganate, and the like, under oxidative oligomerization temperature, pressure and reaction time conditions known to the skilled artisan. For example, this oxidative oligomerization can be carried out by reacting an oil with a peroxy acid under reaction conditions that epoxidize double bonds of the oil, followed by reacting the epoxidized oil with a ring opener such as alcohol See, for example, U.S. Pat. No. 7,786,239, the disclosure of which is incorporated herein by reference.

In a preferred embodiment, the oligomerization is carried out by a blowing reaction, such as reacting the fatty substance composition with an air stream comprising oxygen or pure oxygen or hydrogen peroxide under oxidative oligomerization temperature, pressure and reaction time conditions, optionally in the presence of catalysts. It has been found that imidazoline functionalized emulsifiers made by a blowing reaction are easily and economically produced without the need to handle large amounts of solvent or to carry out expensive purification steps. Additionally imidazoline functionalized emulsifiers made by a blowing reaction have been found to exhibit excellent performance characteristics. While not being bound by theory, it is believed that the oxidized fatty substance composition prepared by blowing is highly suitable for use in preparation of imidazoline emulsification applications due to the properties obtained by the unique mixture of components in the ultimate product that are present as a result of the unique method of preparation. While not being bound by theory, it is believed that the residual component present as a result of blowing fatty substance compositions aid in stabilizing and otherwise enhancing performance of the ultimate emulsifier composition.

The oxidative oligomerization carried out by blowing the fatty substance composition is described in more detail as follows.

The fatty substance composition is heated, in an embodiment, to a temperature of at least 90° C., and preferably from about 100° C. to about 115° C.

In an embodiment, an oxygen-containing stream is passed through the heated fatty substance composition to produce an oxidized fatty substance composition.

Blowing is typically achieved by passing an oxygen-containing stream through the heated fatty substance composition (which may comprise other components (e.g., additives, initiators, catalysts). The vessel containing the fatty substance composition during the blowing step typically operates at about atmospheric pressure. The pressure of the oxygen-containing stream being blown through the fatty substance composition is generally high enough to achieve the desired air flow through the fatty substance composition. The oxygen-containing stream is introduced at a sufficient flow rate for a sufficient period of time to achieve the desired modification of the fatty acid compounds in the fatty substance composition. Typically, the oxygen-containing stream is introduced into the fatty substance composition at a rate of from about 40 to 450 cubic feet per minute in a fatty substance composition batch that is about 45,000 lbs. Preferably, the oxygen-containing stream is dispersed evenly in the vessel to maximize surface area exposure. Typically, the vessel will have a distribution ring or spoke-like header to create small volume bubbles evenly within the fatty substance composition. The duration of blowing the oxygen-containing stream through the fatty substance composition is varied and determined according to the desired properties of the oxidized fatty substance composition and the end-use application for the resulting product.

In one aspect, the oxygen-containing stream is an oxygen enriched stream derived from air. In another aspect, the oxygen-containing stream comprises air. In yet another aspect, the oxygen-containing stream comprises hydrogen peroxide.

In certain aspects where there is little to no concern for a desired acid value or flash point, the method can stop after blowing without proceeding to an optional stripping step. Optionally, the oxidized fatty substance composition can be further modified. One such modification is volatile removal (e.g. stripping) via using a nitrogen sparge and, optionally, under vacuum conditions, and optionally reduced by further reaction to reduce volatile reactive components. To aid in the removal of low molecular weight acidic, or other components, a base metal catalyst may be added to the oxidized fatty substance composition to enhance the stripping step. In preferred aspects, the base metal catalyst, e.g. NaOH or KOH, is added in an amount ranging from 250-1200 ppm, and more preferably ranging from 900-1100 ppm. The amount of catalyst is used sparingly as increased levels of catalyst may produce undesirable soaps.

The oxidized fatty substance composition (whether further modified or not) is reacted with a polyamine comprising at least one ethylene diamine functional group with at least three hydrogens attached to the two nitrogens to form an aminoethylamido functionalized oxidized fatty substance composition. In embodiments, the polyamine is selected from the group consisting of diethylene triamine (DETA), triethylene tetramine (TETA), tetraethylene pentamine (TEPA), pentaethylene hexamine (PEHA), and higher homologues; N-aminoethyl propane diamine, N,N'-diaminoethyl propane diamine and the N-aminoethyl or N,N'-diaminoethyl substituted butane diamines, pentane diamines and hexane diamines, aminoethylethanolamine (AEEA), and mixtures thereof. Further alkyl, alkylamine, other other substituents are possible. In embodiments the polyamine is selected from the group consisting of compounds having the general formulas (I) or (II):

$$H_2NCH_2CH_2NHR \quad (1)$$

where R=H—, $CH_3$—, $C_2H_5$—, $C_3H_7$—, —$CH_2CH_2OH$, —$(CH_2CH_2NH)_xH$ and x=1-10;
or

$$R_1R_2N(CH_2)_yNHR_3 \quad (II)$$

where $R_1$=H—, $CH_3$—, $C_2H_5$—, $C_3H_7$—, $NH_2CH_2CH_2$—.
$R_2$=H—, $CH_3$—, $C_2H_5$—.
$R_3$=H—, $CH_3$—, $C_2H_5$—, $C_3H_7$—, $NH_2CH_2CH_2$—,
and y=2-10;
and mixtures thereof.

Reactions of this type are disclosed in U.S. Pat. No. 4,859,245, which disclosure is incorporated by reference herein.

The imidazoline functionalized oxidized fatty substance emulsifier is then formed from the aminoethylamido functionalized oxidized fatty substance composition. In an embodiment, the aminoethylamido functionality is converted to an imidazoline by removal of water of reaction via exposure of the aminoethylamido functionalized oxidized fatty substance composition to vacuum and heat. In an embodiment, the aminoethylamido functionalized oxidized fatty substance composition is exposed to a vacuum of from about 0 to about 150 torr. In an embodiment, the aminoethylamido functionalized oxidized fatty substance composition is exposed vacuum at a temperature of from about 115° to about 230° C. In an embodiment, the aminoethylamido functionality is converted to an imidazoline to provide an Imidazoline/Amide ratio of from about 1.0 to about 2.2, or from about 1.2 to about L7, or from about 1.3 to about 1.5.

Advantageously, in an embodiment the imidazoline functionalized oxidized fatty substance emulsifier is prepared in a process that does not utilize a separation technique, e.g. a distillation step or other such step that removes a portion of the non-solvent components of the compositions at any of the stages of the described method, such as the oxidized fatty substance composition, the aminoethylamido functionalized oxidized fatty substance composition, the imidazoline functionalized oxidized fatty substance emulsifier, or the imidazoline functionalized oxidized fatty substance emulsifier composition. Avoidance of such separation techniques provides a substantial savings in energy and capital equipment. In embodiments of the invention, presence of various additional materials present in fatty substances that would otherwise be removed may provide advantages in performance of the ultimate composition containing the imidazoline functionalized oxidized fatty substance emulsifier. In another embodiment, the imidazoline functionalized oxidized fatty substance emulsifier is prepared in a process that does utilize a separation technique, however no more than about 10%, or no more than 20%, or no more than 30%, or no more than 40% by weight of any non-solvent components of the composition is removed by the separation technique.

Imidazoline functionalized oxidized fatty substance emulsifiers made by the above described method are specifically contemplated.

Imidazoline functionalized oxidized fatty substance emulsifiers are formulated into imidazoline functionalized oxidized fatty substance emulsifier compositions by mixing with appropriate carriers and other adjuvants to form emulsifier compositions. Advantageously, the carriers and other components of the emulsifier composition may be present with the imidazoline functionalized oxidized fatty substance emulsifier as part of the preparation of the emulsifier, and so will not need to be added as an additional component. Components of the emulsifier composition may comprise any materials appropriate for emulsifiers, such as water, acid (such as HCl or carboxylic acid), viscosity modifiers and latex solutions. In a preferred embodiment, the imidazoline functionalized oxidized fatty substance emulsifiers are quaternized by, for example, quaternization with a halogen-substituted carboxylic or halogen-substituted sulfonic acid or a sulfone. Examples of similar quaternization reactions are described in U.S. Pat. No. 3,738,996.

In an embodiment, the imidazoline functionnalized oxidized fatty substance emulsifier composition comprises less than 15% by weight of the entire composition in total of one or more of undesirable contaminants selected from sterols, steryl esters, and tocopherols. In an embodiment, the imidazoline functionalized oxidized fatty substance emulsifier composition is substantially free one or more of undesirable contaminants selected from sterols, steryl esters, and tocopherols.

A specifically contemplated embodiment of the present invention is an asphalt emulsion composition comprising the imidazoline functionalized oxidized fatty substance emulsifiers described herein. Asphalt is primarily used in road construction projects, where it is often formulated with aggregate particles and applied to road surfaces for sealing functions. The composition is formulated as an emulsion, and then applied to a surface where the emulsion "breaks" and the asphalt will then coalesce on the surface to provide the desired sealing properties. The asphalt emulsion compositions should be stable, yet break within a desired time period after mixing so that the surface to be treated can be used within a reasonable amount of time after application of the asphalt composition. Formulation of asphalt compositions wherein the mix time can be predictably controlled is challenging using commercially available emulsifiers. The present emulsifiers are surprisingly effective in providing predictably controllable asphalt emulsions. Further, emulsion compositions prepared according to the methods as described herein can provide asphalt systems that exhibit a reliable and predictable mix time that can be tailored to provide the desired mix time with when used with aggregates having a given level of aggregate reactivity, such as either a medium or a highly reactive reactivity aggregate.

Surprisingly, the present imidazoline functionalized oxidized fatty substance emulsifiers have been observed to perform very well and to provide predictably controllable mix times even though the compositions are not "pure," in the sense that they have not been subjected to separation techniques to present a narrow band of molecular weight emulsifiers. The distribution of oligomers in the oxidized fatty substance composition instead provides performance benefit in the final product.

Preferred asphalt emulsion composition embodiments include tack coat, cold mix, fog seal, chip seal, slurry seal and microsurfacing compositions. In a preferred embodiment, the asphalt emulsion composition is formulated to be a composition selected from a quick set or slow set composition. In a particularly preferred embodiment, the asphalt emulsion composition is selected from slurry seal and microsurfacing compositions. In an embodiment the imidazoline functionalized oxidized fatty substance emulsifier is selected to provide a Mix Time Performance as according to the test defined below of from about 120 to 300 seconds.

A specifically contemplated embodiments of the present invention are a corrosion inhibitor compositions, epoxy or other polymer curatives compositions, or cationic surfactants for hydrophobization compositions comprising the imidazoline functionalized oxidized fatty substance emulsifier described herein.

EXAMPLES

Representative embodiments of the present invention will now be described with reference to the following examples that illustrate the principles and practice of the present invention.

Example 1. Preparation of Oxidized Fatty Substance Composition

Three separate fatty substance compositions comprising soy based fatty acid are heated to 115° C. An oxygen-containing stream is passed through each of the three heated fatty substance compositions for a time sufficient to produce three oxidized fatty substance compositions comprising 25%, 50%, and 70% by weight, respectively, of oligomeric fatty acid components based on the total weight of fatty acid containing components in the composition.

FIG. 1 is a GPC spectra showing elution of one of the oxidized fatty substance compositions prepared in this example 1.

The GPC spectra of the sample evaluated shows a peak at about 27 minutes that corresponds to elution of monomer, another peak at about 25 minutes that corresponds to elution of dimer, and a third peak at about 24 minutes that corresponds to elution of mers of three or greater. Molecular weight of these components are calculated based on knowledge of purity and molecular weight of the starting materials, and the relative amounts of these components present in the composition are determined by comparison of the relative % area under each peak. In the present sample, the MWs and relative amounts are as follows:

Monomer: 30%—approx MW 282
Dimer: 15%—approx MW 560-600
Three or more mer units: 15%—MW greater han 600

Example 2. Preparation of Imidazoline Functionalized Oxidized Fatty Substance Emulsifier The oxidized fatty substance compositions prepared in Example 1 are reacted with diethylenetriamine to form aminoethylamido functionalized oxidized fatty substance compositions. This reaction is carried out at a temperature of 170-180° C., with nitrogen sparge until an Acid Value of less than 5 is reached.

The aminoethylamido functionalized oxidized fatty substance composition is further reacted to form an imidazoline functionalized oxidized fatty substance emulsifier. Specifically, after the Acid Value is observed to be less than 5, the temperature of the aminoethylamido functionalized oxidized fatty substance composition is maintained at 170-180° C., the nitrogen sparge is removed and vacuum of about 35 Torr is applied to form the imidazoline. Acid Value and the imidazolinelamide ratio are monitored via FTIR. The Imidazoline/Amide ratio was targeted to 1.4.

A sample of unoxidized fatty acid composition was also reacted with diethylenetriamine and further reacted to form an imidazoline functionalized unoxidized fatty substance emulsifier as a control.

The resulting imidazoline emulsifiers were then blended into soap solutions containing water, the emulsifier, HCl, and a latex solution to form imidazoline functionalized oxidized (and unoxidized in the case of the control) fatty substance emulsifier compositions.

Example 3. Mix Time Evaluation—Degree of Oligomerization

The imidazoline functionalized oxidized (and unoxidized in the case of the control) fatty substance emulsifier compositions prepared as described above and asphalt were mixed in an asphalt mill to obtain the respective asphalt emulsions. The final respective emulsions contained 1.4% emulsifier in the total asphalt emulsion.

The asphalt emulsion was then mixed with an aggregate to obtain mix times. The "Mix Time" is defined as the number of seconds that an asphalt emulsion remains liquid when combined with aggregate. Mix time is determined by following the procedures and outlines demonstrated by ISSA TB 113-90. Specifically, mix time is determined by combining 200 g medium reactive aggregate, 2 g cement, 16 g water, and 26 g asphalt emulsion at 25° C. The mixture is then mixed manually until the asphalt emulsion breaks, and the resulting mixture becomes a solid.

The observed mix times were recorded below in Table 1, and additionally Are graphically reported in FIG. 2.

TABLE 1

| % oligomeric components | % emulsifier | Mix time |
|---|---|---|
| 0 | 1.4 | 39 |
| 15 | 1.4 | 117 |
| 50 | 1.4 | 233 |
| 70 | 1.4 | 537 |

Figure 2:
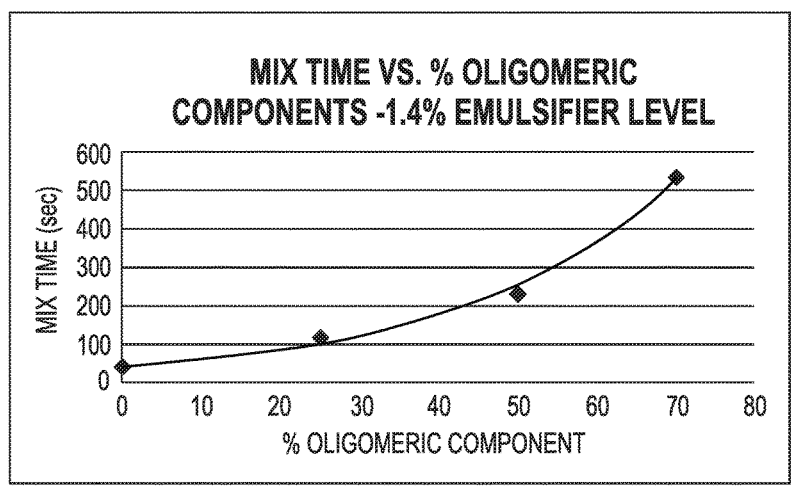
FIG. 2 is a chart showing mix time of asphalt formulations containing imidazoline functionalized oxidized fatty substance emulsifiers having differing levels of oligomeric fatty acid components.

As shown in FIG. 2, like compositions having different percentages of oligomer content exhibit different mix times. It has been found that imidazoline functionalized oxidized fatty substance emulsifiers prepared from oxidized fatty substance compositions having a wt percent oligomer content of from about 20 to about 50% exhibit superior mix times for quick set asphalt emulsion compositions. Further, it has been found that the larger amount of oligomer content in the oxidized fatty substance, the longer mix time is observed.

Example 4. Mix Time Evaluation Emulsifier Content

The imidazoline functionalized oxidized fatty substance emulsifier composition having 70% Oligomer component (i.e. 70% modification) prepared as described above and asphalt were mixed in an asphalt mill to obtain the respective asphalt emulsions. The final respective emulsions contained 0.6%, 1%, 1.4%, and 1.8% emulsifier in the total asphalt emulsion.

The observed mix times were recorded below in Table 2, and additionally are graphically reported in FIG. 3.

TABLE 2

| % emulsifier | Mix time |
|---|---|
| 1.8 | 1000 |
| 1.4 | 537 |

TABLE 2-continued

| % emulsifier | Mix time |
|---|---|
| 1.0 | 201 |
| 0.6 | 20 |

Figure 3:
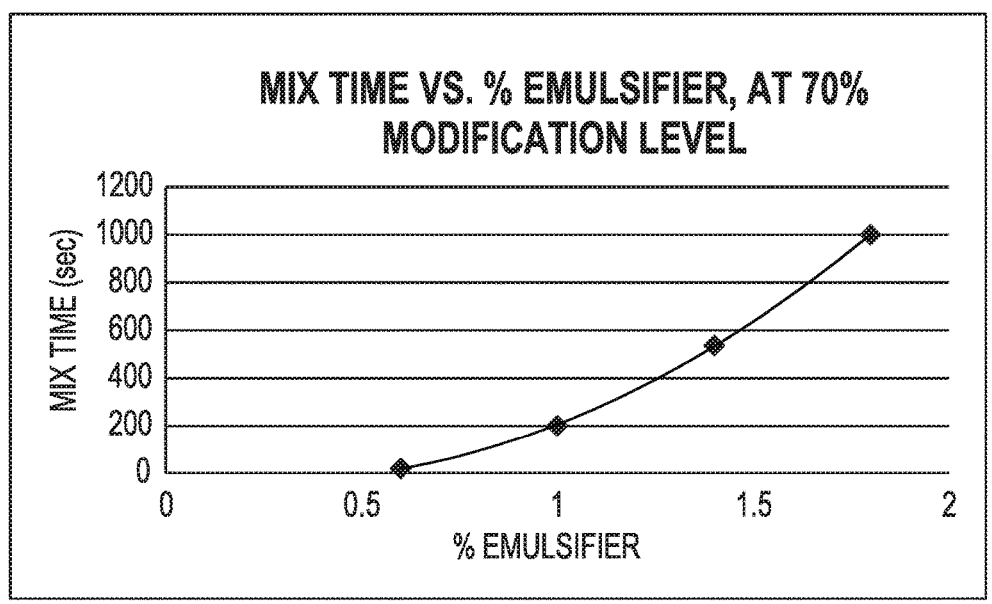
FIG. 3 is a chart showing mix time of asphalt formulations containing imidazoline functionalized oxidized fatty substance emulsifiers having differing levels of emulsifiers in the formulation.

As shown in FIG. 3, compositions having increasing amounts of emulsifier having the same percentage of oligomer content exhibit predictable and increasing mix times.

Advantageously, using the methods as described herein, a reliable and predictable mix time can be obtained with an imidazoline functionalized oxidized fatty substance emulsifier that can be tailored to provide the desired mix time with a given class of aggregate reactivity, such as either a medium or a highly reactive reactivity aggregate.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by 1/10 of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method for making an imidazoline functionalized oxidized fatty substance emulsifier comprising the steps of:
    (a) obtaining a fatty substance composition;
    (b) performing an oxidative oligomerization of the fatty substance composition to produce an oxidized fatty substance composition comprising from about 10 to about 75% by weight of oligomeric fatty acid components based on the total weight of fatty acid containing components in the composition;
    (c) reacting the oxidized fatty substance composition with a polyamine comprising at least one ethylene diamine functional group with at least three hydrogens attached to the two nitrogens to form an aminoethylamido functionalized oxidized fatty substance composition; and
    (d) forming an imidazoline functionalized oxidized fatty substance emulsifier from the aminoethylamido functionalized oxidized fatty substance composition.

2. The method of claim 1, wherein the oxidative oligomerization step comprises the steps
    (b-1) heating the fatty substance composition; and
    (b-2) passing an oxygen-containing stream through the heated fatty substance composition to produce the oxidized fatty substance composition.

3. The method of claim 1, wherein the oxidized fatty substance composition comprises a trimodal molecular weight distribution of the fatty acid containing components.

4. The method of claim 1, wherein the oxidized fatty substance composition comprises
    a trimodal molecular weight distribution of fatty acid containing components, wherein about 30 to about 70% by weight of fatty acid compounds in the oxidized fatty substance composition are in the low molecular weight range of the trimodal molecular weight distribution, about 10 to about 30% by weight of fatty acid compounds in the oxidized fatty substance composition are in the medium molecular weight range of the trimodal molecular weight distribution, and about 10 to about 65% by weight of fatty acid compounds in the oxidized fatty substance composition are in the high molecular weight range of the trimodal molecular weight distribution.

5. The method of claim 1, wherein the oxidized fatty substance composition comprises from about 30 to about 70% by weight of compounds having a fatty acid component that are monomers; from about 5 to about 20% by weight of compounds having a fatty acid component that are dimers, and from about 5 to about 65% by weight of compounds having a fatty acid component having three or more mers, based on the total amount of compounds having a fatty acid component in the oxidized fatty substance composition.

6. The method of claim 5, wherein
    the monomers of the oxidized fatty substance composition have an average molecular weight ranging from about 200 to about 1000 (g/mol),
    the dimers of the oxidized fatty substance composition have an average molecular weight ranging from about 600 to about 2000 (g/mol), and
    the compounds having three or more mers of the oxidized fatty substance composition have an average molecular weight ranging from about 900 to about 3000 (g/mol).

7. The method of claim 5, wherein
    the monomers of the oxidized fatty substance composition have an average molecular weight ranging from about 600 to about 2000 (g/mol),
    the dimers of the oxidized fatty substance composition have an average molecular weight ranging from about 1200 to about 4000 (g/mol), and
    the compounds having three or more mers of the oxidized fatty substance composition have an average molecular weight ranging from about 1800 to about 6000 (g/mol).

8. The method of claim 5, wherein
the monomers of the oxidized fatty substance composition have an average molecular weight ranging from about 900 to about 3000 (g/mol),
the dimers of the oxidized fatty substance composition have an average molecular weight ranging from about 1800 to about 6000 (g/mol), and
the compounds having three or more mers of the oxidized fatty substance composition have an average molecular weight ranging from about 2100 to about 9000 (g/mol).

9. The method of claim 1, wherein the oxidized fatty substance composition has a viscosity of at least 40 cSt at 100° C.

10. The method of claim 1, wherein at least about 60% by weight of the compounds having a fatty acid component in the fatty substance composition from step (a) are compounds selected from the group consisting of fatty acids or their salts, and combinations thereof.

11. The method of claim 1, wherein at least about 60% by weight of the compounds having a fatty acid component in the fatty substance composition from step (a) are compounds selected from the group consisting of the fatty acid esters $C_1$-$C_6$ alkyl mono-alcohols and combinations thereof.

12. The method of claim 1, wherein at least about 60% by weight of the compounds having a fatty acid component in the fatty substance composition from step (a) are compounds selected from the group consisting of the mono-, di-, or tri-fatty acid esters of glycerol and combinations thereof.

13. The method of claim 1, wherein at least about 60% by weight of the compounds having a fatty acid component in the fatty substance composition from step (a) are compounds selected from the group consisting of fatty acid components having an average molecular weight ranging from about 200 to about 1000 (g/mol).

14. The method of claim 1, wherein at least about 60% by weight of the compounds having a fatty acid component in the fatty substance composition from step (a) are compounds selected from the group consisting of fatty acid components having an average molecular weight ranging from about 600 to about 2000 (g/mol).

15. The method of claim 1, wherein at least about 60% by weight of the compounds having a fatty acid component in the fatty substance composition from step (a) are compounds selected from the group consisting of fatty acid components having an average molecular weight ranging from about 900 to about 3000 (g/mol) (g/mol).

16. The method of any of claims 1-8, wherein the fatty substance composition from step (a) are components recovered from a member of the group selected from the group consisting of soybean oil, linseed oil, canola oil, rapeseed oil, cottonseed oil, sunflower oil, palm oil, peanut oil, safflower oil, corn oil, corn stillage oil, tall oil, and combinations thereof.

17. The imidazoline functionalized oxidized fatty substance emulsifier made by the process of claim 1.

18. An asphalt emulsion composition comprising the imidazoline functionalized oxidized fatty substance emulsifier of claim 17.

19. The asphalt emulsion composition of claim 18, wherein the asphalt emulsion composition is selected from a slurry seal composition or a microsurfacing composition.

20. A corrosion inhibitor composition comprising the imidazoline functionalized oxidized fatty substance emulsifier of claim 17.

* * * * *